United States Patent
Gabriel et al.

(10) Patent No.: US 7,962,920 B2
(45) Date of Patent: Jun. 14, 2011

(54) PROVIDING A BUSINESS LOGIC FRAMEWORK

(75) Inventors: Jan Gabriel, Rauenberg (DE); Torsten Born, Zwingenberg-Rodau (DE); Klaus Warth, Graben-Neudorf (DE); Christoph Luettge, Muhltal (DE)

(73) Assignee: SAP AG, Walldorf (DE)

(*) Notice: Subject to any disclaimer, the term of this patent is extended or adjusted under 35 U.S.C. 154(b) by 979 days.

(21) Appl. No.: 11/644,282

(22) Filed: Dec. 22, 2006

(65) Prior Publication Data

US 2008/0155556 A1 Jun. 26, 2008

(51) Int. Cl.
- G06F 3/00 (2006.01)
- G06F 15/02 (2006.01)
- G06F 9/44 (2006.01)
- G06F 15/173 (2006.01)

(52) U.S. Cl. ........ 719/318; 708/110; 708/134; 717/128; 709/223

(58) Field of Classification Search .................. None
See application file for complete search history.

(56) References Cited

U.S. PATENT DOCUMENTS

| | | | |
|---|---|---|---|
| 6,738,965 B1 * | 5/2004 | Webster | 717/128 |
| 7,165,190 B1 * | 1/2007 | Srivastava et al. | 714/38 |
| 2002/0199172 A1 * | 12/2002 | Bunnell | 717/128 |
| 2004/0044987 A1 * | 3/2004 | Kompalli et al. | 717/100 |
| 2004/0158819 A1 * | 8/2004 | Cuomo et al. | 717/128 |
| 2007/0185746 A1 * | 8/2007 | Chieu et al. | 705/7 |

* cited by examiner

Primary Examiner — Andy Ho
Assistant Examiner — Tuan Dao
(74) Attorney, Agent, or Firm — Fish & Richardson P.C.

(57) ABSTRACT

The disclosure includes a system and method for providing a business logic framework. In some implementations, a method includes identifying an event associated with business logic of an application framework. The application framework is associated with method framework logic and the business logic. One or more business objects are identified in accordance with the business logic. The business logic is executed using the identified one or more business objects independent of the method framework logic.

23 Claims, 5 Drawing Sheets

PROVIDING A BUSINESS LOGIC FRAMEWORK

TECHNICAL FIELD

This invention relates to business applications and, more particularly, to providing a business logic framework.

BACKGROUND

Currently, small and large businesses alike complete various transactions through web-based software applications. These transactions consist of the transmission of data between the client (or user) and the server hosting the software application. In many instances, these transactions are carried out through the use of HTML forms or other web-based applications, where the user enters data into various fields or tables and submits the completed form to the server for processing of the data. The server then sends back a response to the user containing the processed form, including the user-entered data and any appropriate messages.

SUMMARY

The disclosure includes a system and method for providing a business logic framework. In some implementations, a method includes identifying an event associated with business logic of an application framework. The application framework is associated with method framework logic and the business logic. One or more business objects are identified in accordance with the business logic. The business logic is executed using the identified one or more business objects independent of the method framework logic.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
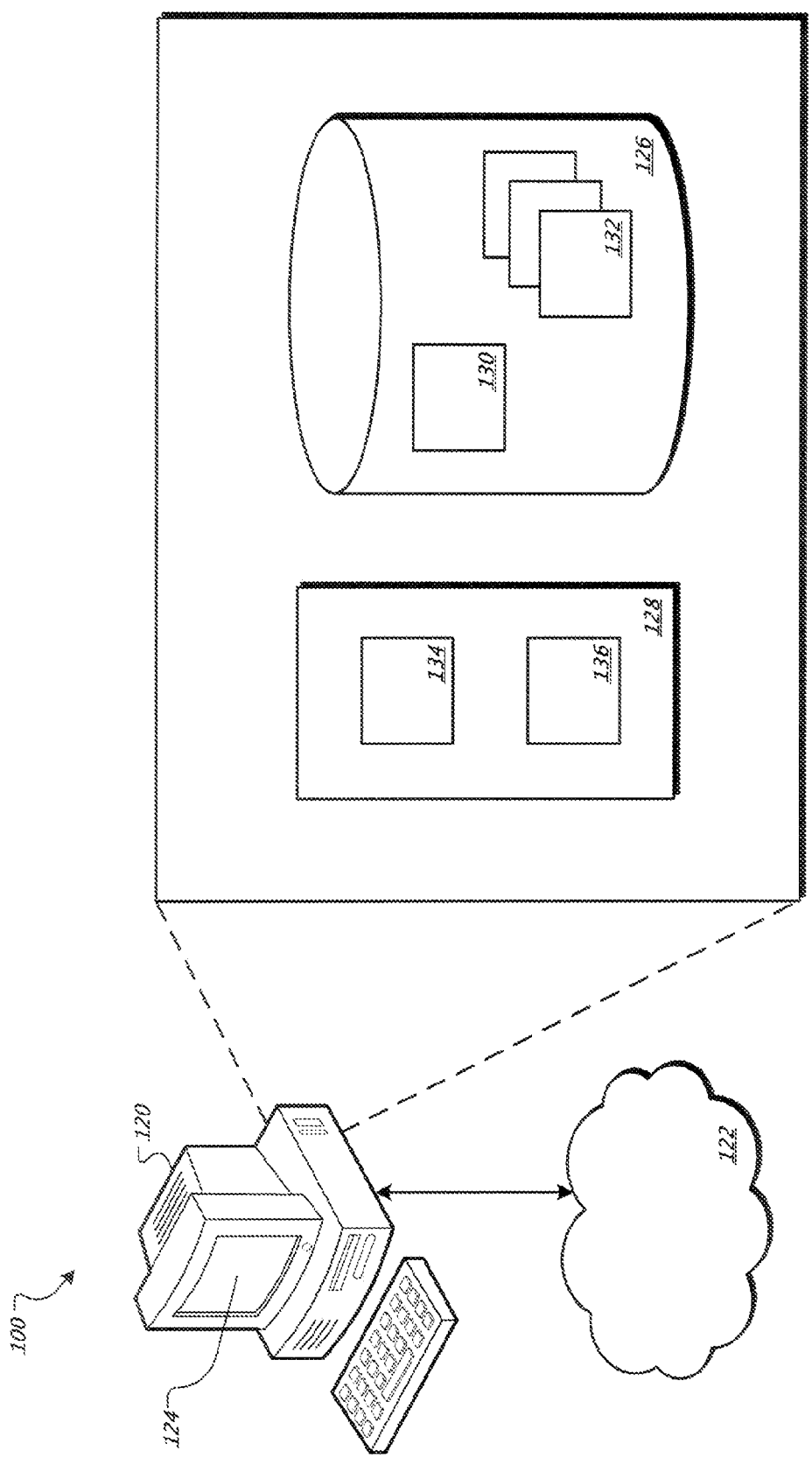
FIG. 1 is a clock diagram illustrating an example system for providing business logic in accordance with some implementations of the present disclosure.

FIG. 1 is a block diagram illustrating an example system 100 for providing business logic independent of process logic in executing business applications. Such business may include checks and/or data enrichments of business objects. Conventionally, an application framework includes both process logic (e.g., versioning, object relations) and business logic for executing application software. In order to perform business logic combined with process logic, the conventional framework requires knowledge of individual business objects. Indeed, software development using such conventional frameworks requires direct access to the application, the business objects, and the conventional framework. In some implementations of the system 100, the process logic and the business logic are separated, independent, or otherwise decoupled. The decoupled logic may reduce, minimize, or otherwise decrease development time of each business object and/or increase the efficiency of application developers when implementing business logic functionality. In some implementations, the decoupled business logic may be implemented by a plurality of different applications.

Figure 2:
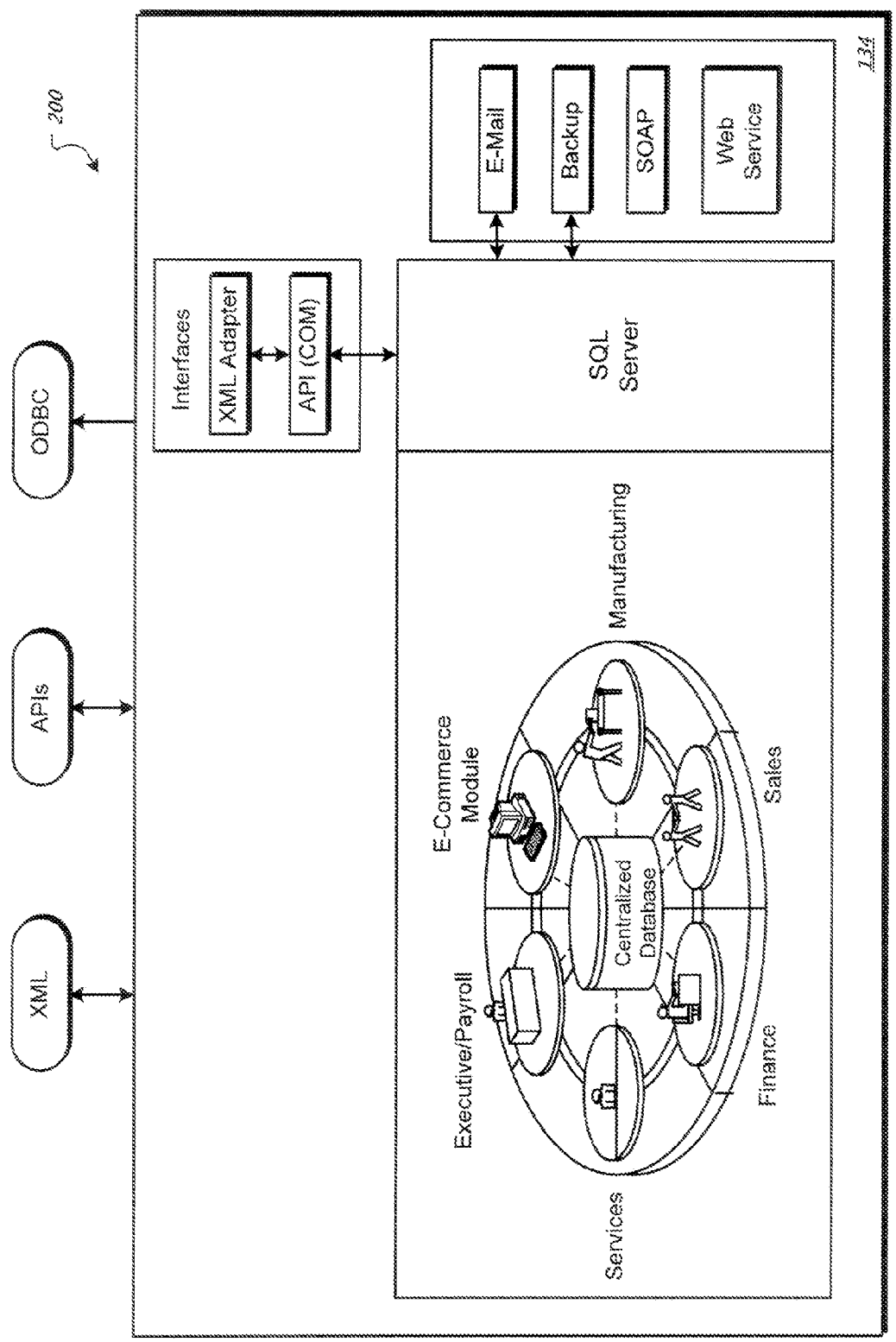
FIG. 2 illustrates an example application implementing certain techniques and components in accordance with some implementations of the present disclosure.

To assist in decoupling the business logic, the system 100 may be a single computer 120 or any portion (including all) of a distributed system including at least one computer 120, perhaps communicably coupled to a network 122. For example, computer 120 may comprise a portion of an information management system that provides a number of software applications to any number of clients. Alternatively, computer 120 may comprise a client processing information in a distributed information management system or enterprise network via one or more software applications. Computer 120 is generally intended to encompass any suitable processing device. For example, although FIG. 2 illustrates computer 120 that may be used with the disclosure, system 100 may be any computer or processing device such as, for example, a blade server, a server pool, general-purpose personal computer (PC), Macintosh, workstation, Unix-based computer, or any other suitable device. In other words, the present disclosure contemplates computers other than general purpose computers as well as computers without conventional operating systems. Computer 120 may be adapted to execute any operating system including Linux, UNIX, Windows Server, or any other suitable operating system. While computer 120 is illustrated as associated with a single entity in FIG. 1, computer 120 may be distributed among multiple entities. Alternatively, each element in FIG. 1 may be included in a separate computer 120. In the event that multiple elements include separate computers 120, the different computers 120 may be incompatible. In the case of incompatibility, computer 120 may include additional features and/or functions operable to translate or otherwise convert between forms compatible with the different computers 120. In some embodiments, the conversion may be transparent to a user of system 100. "Client," "user," and the particular entity may be used interchangeably as appropriate. Regardless, system 100 may be any system operable to decouple process logic and business logic and execute business logic for different software applications.

Computer 120 includes a Graphical User Interface (GUI) 124, memory 126, and processor 128. FIG. 2 only provides one example of a computer that may be used with the disclosure. The present disclosure contemplates computers other than general purpose computers, as well as computers without conventional operating systems. As used in this document, the term "computer" is intended to encompass a mainframe, a personal computer, a client, a server, a workstation, a network computer, a personal digital assistant, a mobile phone, or any other suitable processing device. Computer 120 may be operable to receive input from and display output through GUI 124 for the particular user.

GUI 124 comprises a graphical user interface operable to allow the user of computer 120 to interact with processor 128. The term "computer 120" and the phrase "user of computer 120" may be used interchangeably, where appropriate, without departing from the scope of this disclosure. Generally, GUI 124 provides the user of computer 120 with an efficient and user-friendly presentation of data provided by computer 120. GUI 124 may comprise a plurality of displays having interactive fields, pull-down lists, and buttons operated by the user. And in one example, GUI 124 presents an explorer-type interface and receives commands from the user. It should be understood that the term graphical user interface may be used in the singular or in the plural to describe one or more graphical user interfaces in each of the displays of a particular graphical user interface. Further, GUI 124 contemplates any graphical user interface, such as a generic web browser, that processes information in computer 120 and efficiently presents the information to the user. Network 122 can accept data from the user of computer 120 via the web browser (e.g., Microsoft Internet Explorer or Netscape Navigator) and return the appropriate HTML or extensible Markup Language (XML) responses.

Network 122 facilitates wireless or wireline communication between system 100 and any other computer. Network 122 may communicate, for example, Internet Protocol (IP) packets, Frame Relay frames, Asynchronous Transfer Mode (ATM) cells, voice, video, data, and other suitable information between network addresses. Network 122 may include one or more local area networks (LANs), radio access networks (RANs), metropolitan area networks (MANs), wide area networks (WANs), all or a portion of the global computer network known as the Internet, and/or any other communication system or systems at one or more locations.

Memory 126 may include any memory or database module and may take the form of volatile or non-volatile memory including magnetic media, optical media, Random Access Memory (RAM), Read Only Memory (ROM), removable media, or any other suitable local or remote memory component. In the illustrated embodiment, memory 126 includes interface 130 and business objects 132. But memory 126 may also include any other appropriate data such as a field control registry, VPN applications or services, firewall policies, a security or access log, print or other reporting files, HTML files or templates, child software applications or sub-systems, and others.

Illustrated interface 130 communicates with other computer systems over network 122 in a client-server or other distributed environment. In certain embodiments, computer 120 receives data from internal or external senders through interface 130 for storage in memory 126 and/or processing by processor 128. Generally, interface 130 comprises logic encoded in software and/or hardware in a suitable combination and operable to communicate with network 122. More specifically, interface 130 may comprise software supporting one or more communications protocols associated with communications network 122 or hardware operable to communicate physical signals.

The overall structure of a business object model may ensure the consistency of the interfaces that are derived from the business object model. The derivation may ensure that the same business-related subject matter or concept is represented and structured in the same way in the interfaces. The business object model may define the business-related concepts at a central location for a number of business transactions. In other words, it may reflect the decisions made about modeling the business entities of the real world acting in business transactions across industries and business areas. The business object model is defined by the business objects and their relationship to each other (the overall net structure).

A business object 132 is a capsule with an internal hierarchical structure, behavior offered by its operations, and integrity constraints. Business objects 132 are semantically disjoint, i.e., the same business information is represented once. In the business object model, the business objects 132 may be arranged in an ordering framework (not shown). From left to right, they may be arranged according to their existence dependency to each other. For example, the customizing elements may be arranged on the left side of the business object model, the strategic elements may be arranged in the center of the business object model, and the operative elements may be arranged on the right side of the business object model. Similarly, the business objects may be arranged from the top to the bottom based on defined order of the business areas, e.g., finance could be arranged at the top of the business object model with CRM below finance and SRM below CRM.

To ensure the consistency of interfaces, the business object model may be built using standardized, data types as well as packages to group related elements together, and package templates and entity templates to specify the arrangement of packages and entities within the structure. Data types may be used to type object entities and interfaces with a structure. This typing can include business semantics. For example, the data type BusinessTransactionDocumentID may be a unique identifier for a document in a business transaction. Also, as an example, Data type BusinessTransactionDocumentParty may contain the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types may be based on Core Component Types ("CCTs"), which themselves are based on the World Wide Web Consortium ("W3C") data types. "Global" data types may represent a business situation that is described by a fixed structure. Global data types may include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects 132 and interfaces 130, the same subject matter may be typed with the same data type. For example, the data type "GeoCoordinates" may be built using the data type "Measure" so that the measures in a GeoCoordinate (i.e., the latitude measure and the longitude measure) are represented the same as other "Measures" that appear in the business object model. Entities may be discrete business elements that are used during a business transaction. Entities are frequently not business entities or the components that interact to perform a transaction. Rather, "entities" may be one of the layers of the business object model and the interfaces 130. For example, a Catalogue entity is used in a Catalogue Publication Request and a Purchase Order entity is used in a Purchase Order Request. These entities are created using the data types defined above to ensure the consistent representation of data throughout the entities.

Processor 128 executes instructions and manipulates data to perform operations of computer 120. Although FIG. 1 illustrates a single processor 128 in computer 120, multiple processors 128 may be used according to particular needs, and reference to processor 128 is meant to include multiple processors 128 where applicable. In the illustrated embodiment, processor 128 executes business application 134 and application framework 136 at any appropriate time such as, for example, in response to a request or input from a user of computer 120 or any appropriate computer system coupled with network 122. The business application 134 is any application, program, module, process, or other software that may utilize, change, delete, generate, or is otherwise associated with the business objects 132 according to the present disclosure. For example, the application 134 may execute aspects of procurement such as requisitioning, ordering, receiving, and financial settlement and generate and/or update one or more business objects 132 in accordance with these processes. In certain cases, system 100 may implement a business application 134, as described below in FIG. 2. Regardless of the particular implementation, "software" may include software, firmware, wired or programmed hardware, or any combination thereof as appropriate. Indeed, application 134 may be written or described in any appropriate computer language including C, C++, Java, J#, Visual Basic, assembler, Perl, any suitable version of 4GL, as well as others. For example, returning to the above mentioned business application, the business application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 134 is illustrated in FIG. 2 as including various sub-modules, application 134 may include numerous other sub-modules or may instead be a single multi-tasked module that implements the various features and functionality through various objects, methods, or other processes. Further, while illustrated as internal to the computer 120, one or more processes associated with application 134 may be stored, referenced, or executed remotely. For example, a portion of application 134 may be a web service that is remotely called, while another portion of application 134 may be an interface object bundled for processing at remote client in network 122. Moreover, application 134 may be a child or sub-module of another software module or enterprise application (not illustrated) without departing from the scope of this disclosure. Indeed, application 134 may be a hosted solution that allows multiple parties (such as a manufacturer, a vendor, and/or a customer) in different portions of the process to perform the respective processing.

More specifically, as illustrated in FIG. 2, application 134 may be a business application, or an application built on other applications, that includes an object access layer (OAL) and a service layer. In this example, application 134 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a business application through a uniform interface. The example service layer is operable to provide services to the business application. These layers may help the business application to orchestrate a business process in synchronization with other existing processes (e.g., native processes of enterprise base systems) and leverage existing investments in the IT platform. Further, business application 134 may run on a heterogeneous IT platform. In doing so, business application may be cross-functional in that it may drive business processes across different applications, technologies, and organizations. Accordingly, business application 134 may drive end-to-end business processes across heterogeneous systems or sub-systems. Application 134 may also include or be coupled with a persistence layer and one or more application system connectors. Such application system connectors enable data exchange and integration with enterprise subsystems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a business application 134, it may instead be a standalone or (relatively) simple software program. Regardless, application 134 may also perform processing automatically, which may indicate that the appropriate processing is substantially performed by at least one component of system 100. It should be understood that automatically further contemplates any suitable administrator or other user interaction with application 134 or other components of system 100 without departing from the scope of this disclosure.

The processor also includes the framework 136, which generally unifies portions of software code to reduce development efforts, code maintenance, and operation. More specifically, the framework 136 may be an object-oriented generic framework that instantiates one or more objects, or entities, using a generic data, or class constructor. Once instantiated by the framework 136, objects may be the business objects 132 residing in memory 126. Further, the framework 136 may receive one or more calls from the application 134 to instantiate and/or update objects 132 with a set of predefined attributes located on the framework 136. In addition to instantiating the object with the set of predefined attributes, the framework 136 may receive a set of additional attributes from the application 134, which are also set as instance attributes of the instantiated object. This helps ensure that the instantiated object is consistent, i.e., the attributes of the object reflect the additional attributes located in the application 134. In updating business objects 132, the framework 136 may facilitate process logic functionality as well as business logic functionality for an application such as the business application 134. For example, the framework 136 may allocate the data services according to requests received from the application 134. The data services may include the business objects 132 that provide one or more pieces of data to the application 134 by, for example, performing an operation utilizing data from the application 134 or providing one or more pieces of data to the application 134. For example, the application 134 may require a report on all open sales invoices. As a result, the application 134 may send a request to one of the business objects 132 that is configured to search through a compilation of the sales invoices and determine which of the invoices are open. The framework 136 may facilitate transmittal of the results back to the client 104. Consequently, the framework 136 may facilitate communications with the application 134. In certain cases, the framework 136 may be further operable to perform other types of processing or include links to such other functionality. For example, the framework 136 may implement, include, or be communicably coupled with a business application at a remote location, such as network 122.

In one aspect of operation, the application 134 transmits a request to the framework 132 to execute business logic. In response to at least the request, the framework identifies one or more business objects 132 associated with the business logic. The framework 132 executes the business logic independent of method framework logic using the identified business objects 132. The framework 132 transmits message to the application 134 in accordance with the execution.

Figure 3:
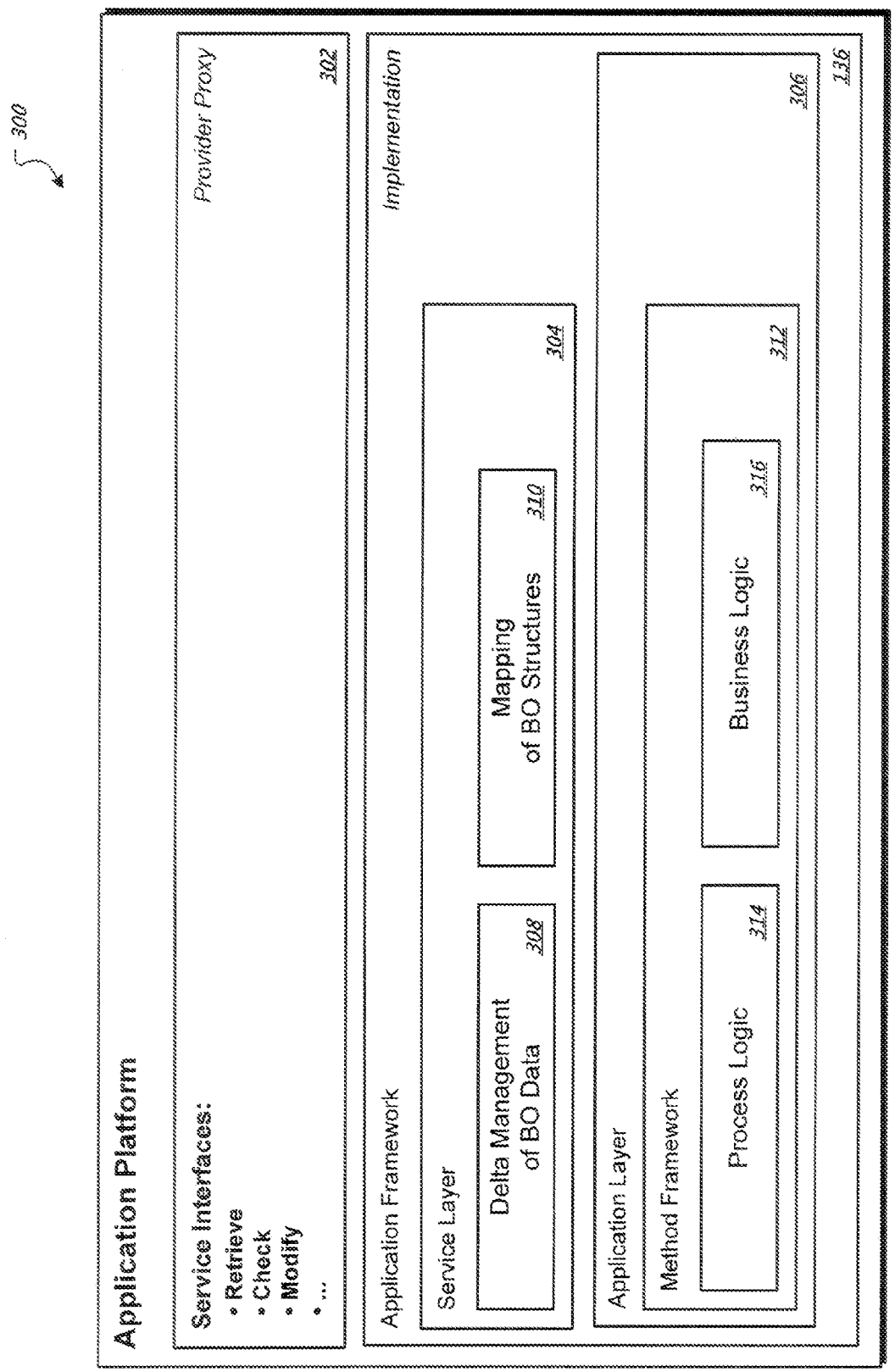
FIG. 3 an example application platform for providing business logic in the system of FIG. 1 in accordance with some implementations of the present disclosure.

FIG. 3 illustrates one example of an application platform 300 for the application 134. It will be understood that the application platform 300 is for example purposes only. Accordingly, the system 100 may some, none, or all of the elements illustrated in the application platform 300 without departing from the scope of this disclosure.

At a high level, the application platform 300 includes service interfaces 302 and the application framework 136. The service interfaces 302 facilitate communication between applications such as the business application 134 and business objects 132. Each interface 302 may be associated with a different processes such as retrieve information from business objects 132, check information included in business objects 132, modify information in business objects 132, and other processes associated with business objects 132. In the illustrated implementation, the application framework 136 includes a service layer 304 and an application layer 306. The layers 304 represent different aspects of the application framework 136. The service layer 304 may include a delta management of BO (business object) data 308 and a mapping of BO structures 310. The delta management 308 may provide additional business-object data as a result of knowledge out of the procurement document framework. The mapping 310 maps or otherwise associates different business objects 132. The application layer 306 includes a method framework 312 for executing methods associated with the business application 134. In the illustrated implementation, the method framework 312 includes process logic 314 and business logic 316. The process logic 314 may mange the sequence of calls into the business logic framework and the data persistent. The business logic executes functions in connection with the business objects 132 such as checks (e.g., price checks, data checks) and/or data enrichment. In some implementations, document specific business logic 316 may be applied for a specific document type whereas generic business logic 316 may be applied for multiple types of business documents. In some implementations, checks executed by the business logic 316 may comprise a semantic grouping of checks that may issue one or more messages. In this case, checks may update data included in business objects 312. As indicated in this implementation, the process logic 314 and the business logic 314 separated, decoupled, or otherwise independent. As a result, the business logic 314 may be applied by other applications in network 122 different from the business application 134.

In some implementations, the method framework 312 persists business objects 132 data in different database tables. This method framework 312 may process the following data sequentially: the header data may be processed, the data of the sets attached to the header, the item data, and the sets on the items. The method framework 312 may associated a maintain routine for each table. These maintain routines may be executed in connection with create, update and/or check tasks. In this case, the business logic 316 may be executed in connection with the maintain routines. In some implementations, checks and checks across multiple business objects 132 may be executed after processing the header-, item- and overall document data. In doing so, the business logic 316 may be called at defined positions within the method framework 312a. The following illustrates example update routines in the method framework 312.

TABLE 1

| node type | DB table | function group | update routine |
|---|---|---|---|
| header | CRM_ORDERADM_H<br>BBP_PDHGP<br>BBP_PDPSET<br>BBP_PDHSB<br>. . . | /SRMAP/FND_PDHAD<br>/SRMAP/FND_PDHGP | hdradm_maintain<br>hdrproc_maintain |
| sets on header | BBP_PD<SET> | /SRMAP/FND_PD<SET> | pd<set>_maintain_all/single |
| item | CRM_ORDERADM_I<br>BBP_PDIGP<br>BBP_PDPSET<br>BBP_PDBEI<br>BBP_PDISB<br>. . . | /SRMAP/FND_PDIAD<br>/SRMAP/FND_PDIGP | itmadm_maintain_single<br>itmproc_maintain |
| sets on items | BBP_PD<SET> | /SRMAP/FND_PD<SET> | pd<set>_maintain_all/single |

The locations of the business logic 316 in the method framework 312 may be referred to as check points. At each check point, a check point method may be called, which may be defined in the interface IF_FND_CHECKPOINTS (discussed in more detail below). These check point methods may be implemented by the class CL_FND_CONTEXT. During execution, a checkpoint method may retrieve a check procedure table including check functions for the business object 132. In some implementations, this check procedure table is extracted out of an XML document that contains the check functions implemented for the current processed business object 132. A check interpreter may trigger execution of each check function which is represented by an individual check class. In some implementations, the location of the check points and the check point methods of the business logic 316 are illustrated in the table below.

TABLE 2

| node type | function group | check point called by: | check point methods (of CL_FND_CONTEXT) |
|---|---|---|---|
| header | /SRMAP/FND_PDHAD | hdradm_maintain -><br>hdradm_check | CHECKPOINT_HDRADM |
| | /SRMAP/FND_PDHGP | hdrproc_maintain -><br>hdrproc_check | CHECKPOINT_HDRPROC |

TABLE 2-continued

| node type | function group | check point called by: | check point methods (of CL_FND_CONTEXT) |
|---|---|---|---|
| sets on header | /SRMAP/FND_PD<SET> | pd<set>_maintain_all/single -> pd<set>_check_all/single | CHECKPOINT_PD<SET>_MAINTAIN_ALL/SINGLE |
| cross header | /SRMAP/FND_PD | header_handle_events header_cross_checks | CHECKPOINT_HDREVENTS CHECKPOINT_HDRXCHECKS |
| item | /SRMAP/FND_PDIAD | itmadm_maintain_single -> itmadm_check_and_enrich | CHECKPOINT_ITMADM |
|  | /SRMAP/FND_PDIGP | itmproc_maintain -> itmproc_check_and_enrich | CHECKPOINT_ITMPROC |
| sets on items | /SRMAP/FND_PD<SET> | pd<set>_maintain_all/single -> pd<set>_check_all/single | CHECKPOINT_PD<SET>_MAINTAIN_ALL/SINGLE |
| cross item | /SRMAP/FND_PDIAD | item_handle_events item_cross_checks | CHECKPOINT_ITMEVENTS CHECKPOINT_ITMXCHECKS |
| cross document | /SRMAP/FND_PD | procdoc_handle_events procdoc_cross_checks | CHECKPOINT_EVENTS CHECKPOINT_XCHECKS |

In some cases, a separate check class may be implemented each check function. Depending whether a check function represents a read-only check or an enrichment check, a check class may implement an interface 'IF_FND_<checkpoint>_VERIFY' or 'IF_FND_<check-point>_ENRICH', respectively. Implementations of generic checks may reside in a Foundation Layer (see below) whereas implementations of business object specific checks may be assigned to an appropriate package of a corresponding logical deployment unit (LDU).

Figure 4:
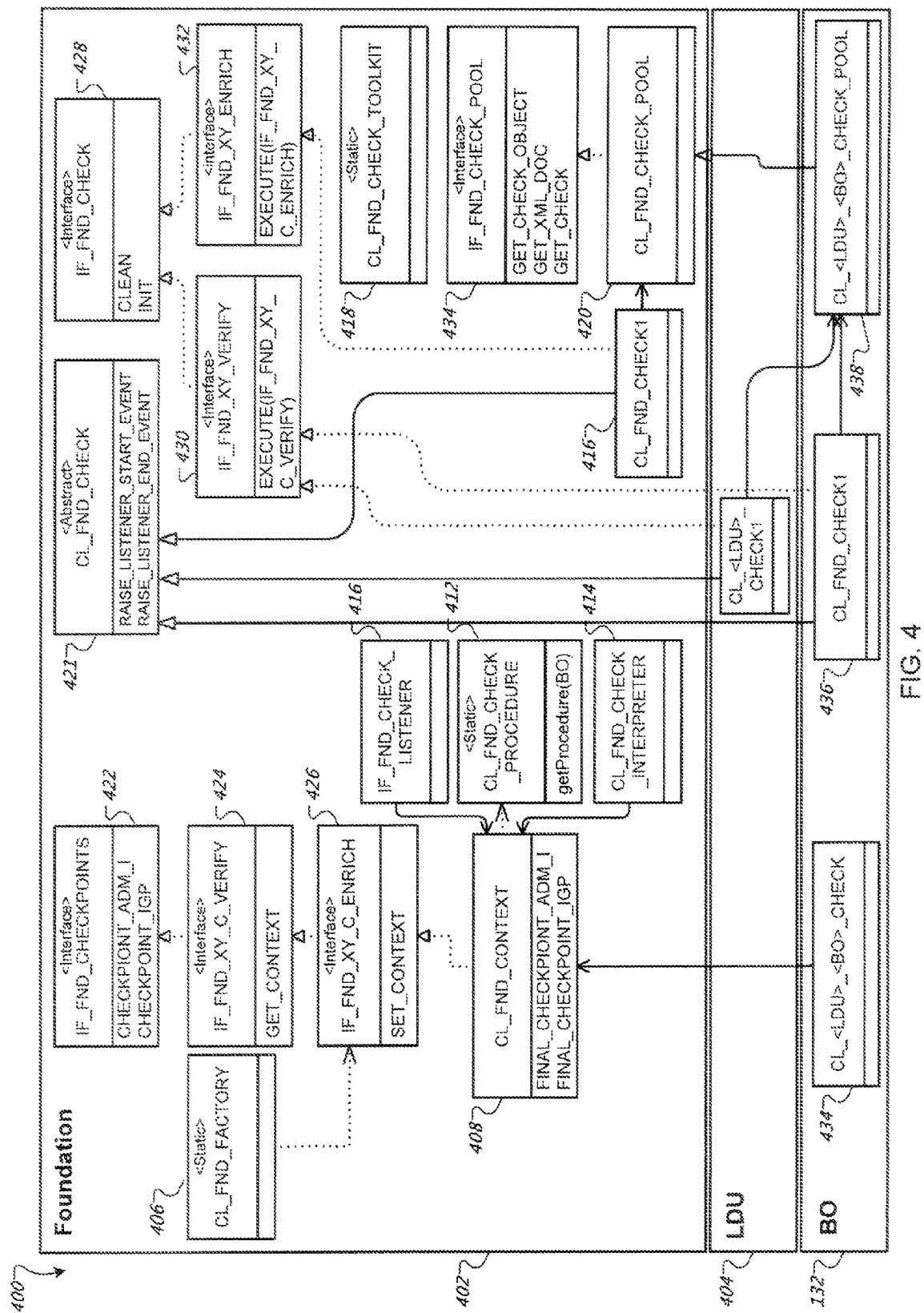
FIG. 4 is a schematic of a class diagram of business logic framework in the system of FIG. 1 in accordance with some implementations of the present disclosure.

FIG. 4 illustrates one example of a class diagram 400 for business logic framework. It will be understood that the class diagram 400 is for example purposes only. Accordingly, the system 100 may some, none, or all of the elements illustrated in the class diagram 400 without departing from the scope of this disclosure.

At a high level, the class diagram 400 includes a foundation layer 402, an LDU 404, and a business object 132 (BO 132). In the illustrated implementation, the foundation includes the following classes: CL_FND_FACTORY 406, CL_FND_CONTEXT 408, CL_FND_CHECK_LISTENER 410, CL_FND_CHECK_PROCEDURE 412, CL_FND_CHECK_INTERPRETER 414, CL_FND_CHECK1 416, CL_FND_CHECK_TOOLKIT 418, CL_FND_CHECK_POOL 420, and CL_FND_CHECK 421. The foundation layer includes the following interfaces: IF_FND_CHECKPOINTS 422, IF_FND_XY_C_VERIFY 424, IF_FND_X-Y_C_ENRICH 426, IF_FND_CHECK 428, IF_FND_X-Y_VERIFY 430, IF_FND_XY_ENRICH 432, and IF_FND_CHECK_POOL 434. The factory class CL_FND_FACTORY 406 MAY provide A capability to return an object of the class CL_FND_CONTEXT 408 which includes a business object specific class from type object and an attribute that specifies the business object 132. The class CL_FND_CONTEXT 408 may include n methods (e.g., check point methods), defined in the interface IF_FND_CHECKPOINTS 422. These methods may represent the individual checkpoints and may be invoked by a method layer to initiate execution of check functions. The class CL_FND_CONTEXT 408 may include data available at each checkpoint that may be required for data verification within the checks. The available data context will be specified in the signature of its corresponding checkpoint method in the interface IF_FND_CHECKPOINTS 422. Example check point methods are listed in Table 2 illustrated above.

The context may be provide a capability to separate read-only and data enrichment checks. The read-only access may be provide by the interface IF_FND_XY_C_VERIFY 424. The data enrichments may be provided by the interface IF_FND_XY_C_ENRICH 426. In some implementations, the letters 'XY' are a placeholder to indicate the appropriate check point for interface is specified such as the examples illustrated in Table 3.

TABLE 3

| node type | function group | check point at | 'XY' placeholder in IF_FND_XY_C_VERIFY/ENRICH |
|---|---|---|---|
| header | /SRMAP/FND_PDHAD | hdradm_maintain -> hdradm_check | HADM |
|  | /SRMAP/FND_PDHGP | hdrproc_maintain -> hdrproc_check | HPROC |
| sets on header | /SRMAP/FND_PD<SET> | pd<set>_maintain_all/single -> pd<set>_check_all/single | <SET>_ALL/SINGLE |
| cross header | /SRMAP/FND_PD | header_handle_events header_cross_checks | HEV HXCH |
| item | /SRMAP/FND_PDIAD | itmadm_maintain_single -> itmadm_check_and_enrich | IADM |
|  | /SRMAP/FND_PDIGP | itmproc_maintain -> itmproc_check_and_enrich | IPROC |
| sets on items | /SRMAP/FND_PD<SET> | pd<set>_maintain_all/single -> pd<set>_check_all/single | <SET>_ALL/SINGLE |

TABLE 3-continued

| node type | function group | check point at | 'XY' placeholder in IF_FND_XY_C_VERIFY/ ENRICH |
|---|---|---|---|
| cross item | /SRMAP/FND_PDIAD | item_handle_events | IEV |
| | | item_cross_checks | IXCH |
| cross document | /SRMAP/FND_PD | procdoc_handle_events | EVENTS |
| | | procdoc_cross_checks | XCHECKS |

An observer object of the class CL_FND_CHECK_LISTENER 416 may be generated by the initialization of the class CL_FND_CONTEXT 408. In some implementations, every checkpoint method initially calls the static method getProcedure in the class CL_FND_CHECK_PROCEDURE 412. By providing the business object's name, the checkpoint and the condition parameters to the getProcedure method, a table may be returned that contains check functions relevant for the business object 132 currently processed. This table may be identified as check procedure table. The returned check procedure table and the current context object CL_FND_CONTEXT 408 may be passes to a method of the class CL_FND_CHECK_INTERPRETER 414.

The class CL_FND_CHECK_PROCEDURE 412 may provide a capability of returning a table containing a procedure of check with respect to the provided input parameters. In doing so, the method getProcedure may access to a global check procedure definition (e.g., XML document). In some implementations, the global check procedure definition is maintained by the business object owner. To assemble the returning table, the global check procedure definition is often readout and interpreted regarding to the input parameters. To avoid repeating data acquisition, the factory class may be static.

The class CL_FND_CHECK_INTERPRETER 414 may trigger execution dependent on the content of check procedure table. The interpreter may generate an instance of the check class by calling the check pool class. Data available at each checkpoint and the condition parameters (e.g., a park, save flag) may be provided to the check classes. To provide the capability of raising events within the execution of checks, the interpreter may register checks to the observer class CL_FND_CHECK_LISTENER 410. Additionally, the interpreter may raise an 'trigger of execution' event. In the case of wrong parameters (e.g., non existing check) the interpreter may exit with an exception.

The class CL_FND_CHECK_LISTENER 410 can be an instrument used to observe the state of a check in the business logic framework. An instance of the class CL_FND_CHECK_LISTENER 410 may be registered to listen for events which may be raised by the observed checks. Every raised event may be registered in an internal event repository which is an attribute of the class CL_FND_CHECK_LISTENER 410. For runtime analysis, the repository may be accessible at the end of each checkpoint.

The class CL_FND_CHECKPOOL 420 may provide the capability to return an instance of a check class that is requested by the interpreter. In some implementations, the class CL_FND_CHECKPOOL 420 includes a method that generates a new instance of the requested check class if one does not exist. If one does exist, a reference to the requested check object is returned to the interpreter. In some implementations, the class CL_FND_CHECKPOOL 420 is static.

The class CL_FND_TOOLKIT 418 may contain predefined methods that represent functionality which can be reused within individual check class implementations from various business object type. In some implementations, every method raises an event of executions. For accessibility and visibility reasons, the class CL_FND_TOOLKIT 418 may be static.

In respect to the extensibility of the framework 402, each check class may inherit from the abstract class CL_FND_CHECK 421. The class CL_FND_CHECK 421 may be used to predefine events that can be triggered by the inherited check class.

The business object 132 may include the following classes: CL_<LDU>_<BO>_CHECK 434, CL_<LDU>_<BO>_CHECK1 436, and CL_<LDU>_<BO>_CHECK_POOL 438. The class CL_<LDU>_<BO>_CHECK 434 may provide the capability to implement functionality available during a checkpoint procedure. In addition, CL_<LDU>_<BO>_CHECK 434 may also be an additional business object specific context. For example, a method responsible for data acquisition of a partner set may be implemented in this class. The access to this data may be available during a checkpoint. In some implementations, CL_<LDU>_<BO>_CHECK 434 may prevent, minimize, or reduce redundant coding and/or provide reusability for the business owner.

In general, a check class may represent and describe a single business logic condition (i.e. a check function). When requested, the check functions may be executed with the data available at runtime. In some implementations, the preconditions for executing a check may be defined in the global check procedure definition. Check classes may be assigned to development packages of their appropriate domain (e.g., Foundation, LDU, business object).

In some implementations of a check class, it may be possible to choose a checkpoint (and thus to choose the available data to be checked) and to differentiate between read and write data access (read/write). This criteria may be covered by interfaces, which may be chosen during the design phase and be implemented by the check class. In some implementations, the following interfaces may be available (XY is representing a checkpoint, see Table 3):

Verify checks: Checks that perform verification on data and generate messages may implement the interface IF_FND_XY_VERIFY.

Enrichment checks: Checks that perform verifications and enrich data may implement the interface IF_FND_XY_ENRICH.

In some implementations, these interfaces may include a description of a method is implemented in the check class. For example, this method may be executed by the class CL_FND_CHECK_INTERPRETER 414 during runtime. In some implementations, a check function may implement from, inherit from the interface IF_FND_CHECK 428. This interface may include methods for the initiation and/or clean-up process. The method INIT may act as a constructor. The method CLEAN may act as a destructor. These methods may be implemented by a responsible check class owner.

Check classes implemented in the foundation layer 402 may be reused by different business object types. Check classes located in the LDU 404 may include functionality that can be reused by assigned business objects 132. In some implementations, the name of a check class is assembled by the following elements: CL_<LDU>_<BO>_<CHECK_NAME>. For example, the class CL_PUR_PO_CHECK_QUANTITY may comprise a check class used by a purchase order. In another example, the class CL_FND_ENRICH_ADMI may comprise a generic check provided by the foundation 402 that can be reused by different business objects 132.

A check class may be published to the framework 402 to be triggered at runtime. In some implementations, the check class may be published in the global check procedure definition. The definition may exist once per business object type and may include the following information for the checks:

Checkpoint: The name of the entry point (checkpoint) where the business logic framework is triggered by the method layer. The names may be identical with the check point method names listed in Table 2.

Name: The name of the check in its business context

Class: The name of the check class that may be called by the framework

Conditions: There are the following condition parameters

CheckBefore: Name of the check that may be executed previously. Indeed, this value may define the sequence by which checks are executed at runtime.

The following tables includes example condition parameters that the business logic framework may use to execute check classes.

TABLE 4

| | |
|---|---|
| p_create | (boolean) |
| p_check | (boolean) |
| p_update | (boolean) |
| p_park | (boolean) |
| p_save | (boolean) |
| p_check_all | (boolean) |

Figure 5:
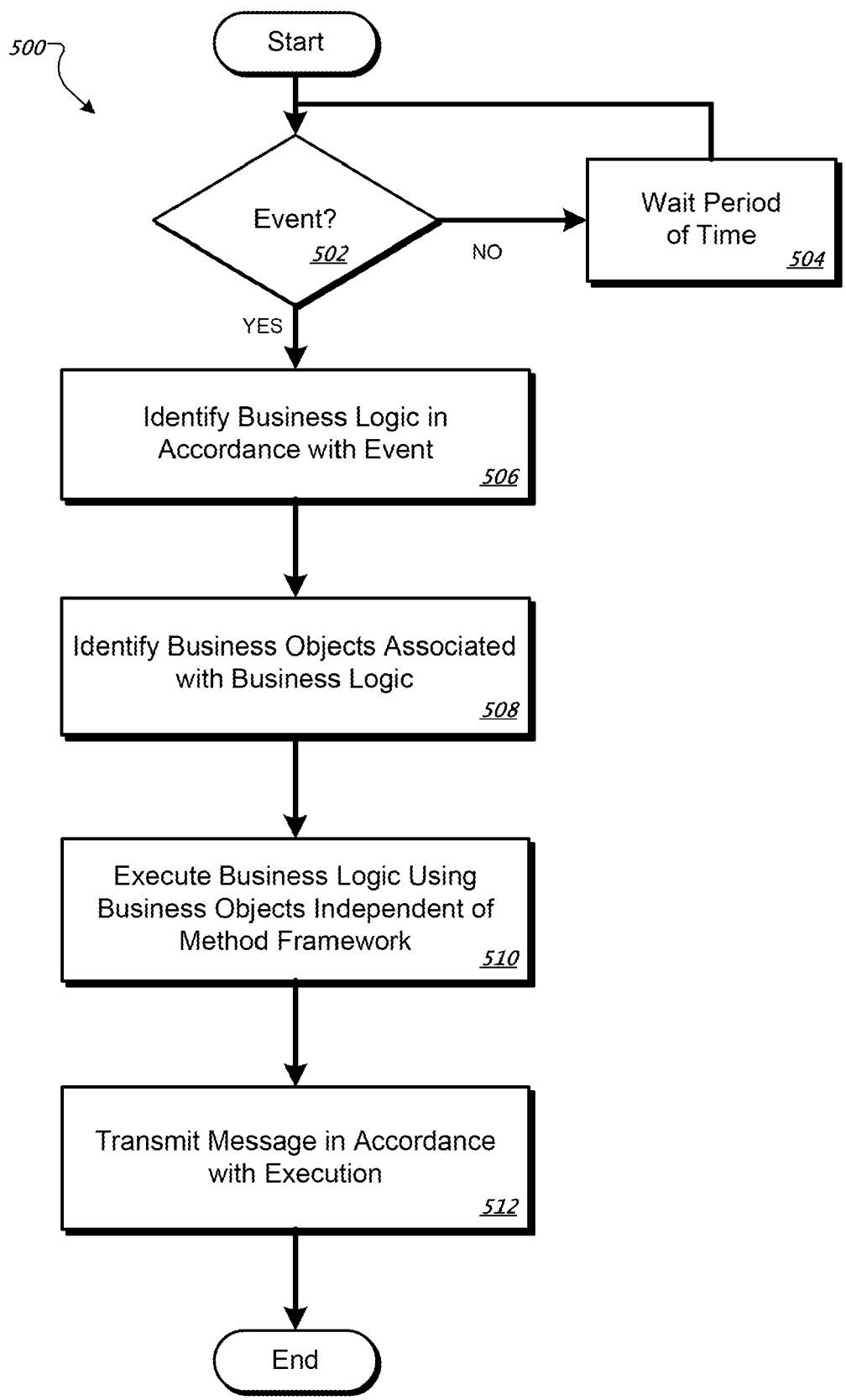
FIG. 5 is a flow diagram illustrating an example method for providing business logic in accordance with some implementations of the present disclosure.

FIG. 5 illustrates a flowchart of an example method 500 for providing business logic independent of process logic. The method 500 may be performed, for example, by a system such as the system 100 and, for clarity of presentation, the description that follows uses the system 100 as the basis of an example for describing the method 100. However, another system, or combination of systems, may be used to perform the method 500.

Method 500 begins at decisional step 502 where execution proceeds to step 504 if no event has occurred. At step 504, a period of time expires before execution returns to the decisional step 502. If an event is identified at decision step 502, then business logic in accordance with the event is identified at step 506. Next, at step 508, the framework 136 identifies one or more business objects 132 associated with the business logic. The framework 136 executes the business logic using the identified business objects 132 at step 510. At step 512, the framework 132 transmits a message in accordance with the execution to an application such as business application 134.

Although this disclosure has been described in terms of some implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for providing business logic, the method performed by at least one computing device, and comprising:

receiving a first request from a first application to execute particular business logic associated with an application framework, the application framework providing process logic, wherein the particular business logic is decoupled from the process logic;

identifying a first checkpoint in a plurality of checkpoints, each checkpoint in the plurality of checkpoints configured to trigger execution of at least a portion of the particular business logic associated with at least one business object in a set of business objects;

retrieving a first check procedure file in response to identifying the first checkpoint, the first check procedure file including at least one first business logic check function corresponding at least to a first business object in the set of business objects;

executing the first business logic check function included in the first check procedure file, wherein executing the first business logic check function includes use of the first business object;

receiving a first message in response to the execution of at least the first check function;

identifying a second checkpoint in the plurality of checkpoints;

retrieving a second check procedure file in response to identifying the second checkpoint, the second check procedure file including at least one second business logic check function corresponding to at least one business object in the set of business objects;

executing the second business logic check function included in the second check procedure file, wherein executing the second business logic check function includes use of a business object in the set of business objects; and receiving a second message, into memory, in response to the execution of at least the second check function included in the second check procedure file.

2. The method of claim 1 wherein the check procedure file is a table.

3. The method of claim 2, wherein the table is extracted from an XML document containing a total number of business logic check functions associated with at least one business object in the set of business objects.

4. The method of claim 1, further comprising receiving at least one condition parameter, the first business logic check function corresponding to the at least one condition parameter.

5. The method of claim 1, wherein the first check procedure file is retrieved in response to calling a first checkpoint method corresponding to the first checkpoint.

6. The method of claim 1, the first check function checks current values of data of the first business object.

7. The method of claim 1, the first check function performs data enrichment of at least one value of the first business object.

8. The method of claim 1, further comprising:

receiving at least one request from a second application to execute at least a particular portion of the particular business logic provided using an application framework, wherein the second application is different from the first application; and executing at least the particular portion of the particular business logic for the second application, independent of the process logic, wherein the business logic executed for the second application includes the first business logic check function.

9. The method of claim 1, wherein the particular business logic associated with the application framework is integrated into a business logic framework, the business logic framework different than the application framework.

10. The method of claim 1 further comprising:
identifying, in response to the request from the first application, the first business object in the set of business objects; and
sending a request for the first check procedure file, wherein the request for the first check procedure file identifies the first business object and the first checkpoint;
wherein the first check procedure file is retrieved based on the identification of at least one of the first business object or the first checkpoint.

11. The method of claim 1, wherein the first check procedure file includes a plurality of business logic check functions.

12. An article comprising a non-transitory, machine-readable storage device storing instructions operable to cause at least one machine to perform operations comprising:
receiving a first request from a first application to execute business logic associated with an application framework, the application framework providing process logic, wherein the business logic is decoupled from the process logic;
identifying a first checkpoint in a plurality of checkpoints, each checkpoint in the plurality of checkpoints configured to trigger execution of business logic associated with at least one business object in a set of business objects;
retrieving a first check procedure file in response to identifying the first checkpoint, the first check procedure file including at least one first business logic check function corresponding at least to a first business object in the set of business objects;
executing the first business logic check function included in the first check procedure file, wherein executing the first business logic check function includes use of the first business object;
receiving a first message in response to the execution of at least the first check function;
identifying a second checkpoint in the plurality of checkpoints;
retrieving a second check procedure file in response to identifying the second checkpoint, the second check procedure file including at least one second business logic check function corresponding to at least one business object in the set of business objects;
executing the second business logic check function included in the second check procedure file, wherein executing the second business logic check function includes use of a business object in the set of business objects; and
receiving a second message, into memory, in response to the execution of at least the second check function included in the second check procedure file.

13. The article of claim 12, the first check function checks current values of data of the first business object.

14. The article of claim 12, the first check function performs data enrichment of at least one value of the first business object.

15. The article of claim 12, the operations further comprising:
receiving at least one request from a second application to execute the business logic provided using an application framework, the second application is different from the first application; and
executing the business logic for the second application independent of the process logic, wherein the business logic executed for the second application includes the first business logic check function.

16. The article of claim 12, wherein the business logic associated with the application framework is integrated into a business logic framework, the business logic framework different than the application framework.

17. The article of claim 12, wherein the first and second check functions are provided through a business logic framework.

18. A server of a business logic framework, the server comprising one or more processors operable to:
receive a first request from a first application to execute business logic associated with an application framework, the application framework providing process logic, wherein the business logic is decoupled from the process logic;
identify at least one business object in a set of business objects stored in at least one storage device in response to the first request;
identify a first checkpoint in a plurality of checkpoints, each checkpoint in the plurality of checkpoints configured to trigger execution of business logic associated with at least one business object in a set of business objects;
retrieve a first check procedure file in response to identifying the first checkpoint, the first check procedure file including at least one first business logic check function corresponding at least to a first business object in the set of business objects;
execute the first business logic check function included in the first check procedure file, wherein executing the first business logic check function includes use of the first business object;
receive a first message in response to the execution of at least the first check function;
identify a second checkpoint in the plurality of checkpoints;
retrieve a second check procedure file in response to identifying the second checkpoint, the second check procedure file including at least one second business logic check function corresponding to at least one business object in the set of business objects;
execute the second business logic check function included in the second check procedure file, wherein executing the second business logic check function includes use of a business object in the set of business objects; and
receive a second message, into memory, in response to the execution of at least the second check function included in the second check procedure file.

19. The server of claim 18, wherein the first business logic check function is a business-object-specific business logic check function.

20. The server of claim 18, wherein the first business logic check function is a generic business logic check function.

21. The server of claim 18, further operable to:
receive at least one request from a second application to execute the business logic provided using an application framework, the second application is different from the first application; and
execute the business logic for the second application independent of the process logic, wherein the business logic executed for the second application includes the first business logic check function.

22. The server of claim 18, wherein the business logic associated with the application framework is integrated into a business logic framework, the business logic framework different than the application framework.

23. The server of claim 18, wherein the business logic framework provides business logic including the first and second check function.

* * * * *